United States Patent [19]

Balestrieri

[11] Patent Number: 5,190,647

[45] Date of Patent: Mar. 2, 1993

[54] AQUARIUM VENTURI TUBE

[76] Inventor: Jason R. Balestrieri, Rte. 11 Box 7, Sante Fe, N. Mex. 87501

[21] Appl. No.: 929,017

[22] Filed: Aug. 13, 1992

[51] Int. Cl.$^5$ .............................................. A01K 63/04
[52] U.S. Cl. .................................. 210/169; 210/416.2; 119/5; 261/77
[58] Field of Search .................. 210/169, 416.2, 221.2; 119/5; 261/77, 123

[56] References Cited

U.S. PATENT DOCUMENTS

| | | | |
|---|---|---|---|
| 3,738,620 | 6/1973 | Ennis | 210/169 |
| 4,687,494 | 8/1987 | Escobal | 210/169 |
| 4,934,187 | 6/1990 | Woltman | 73/861.57 |
| 4,957,623 | 9/1990 | Henzlik | 210/169 |

Primary Examiner—Peter Hruskoci
Assistant Examiner—Robert James Popovics
Attorney, Agent, or Firm—Leon Gilden

[57] ABSTRACT

An organization to direct increased fluid flow through the tube to effect filtration and aeration thereof is provided formed with an upper tube coaxially aligned within and spaced from a lower tube having a venturi central tube portion. An aeration tube is coaxially directed through the venturi tube structure, with constriction of the central tube effecting increased lifting of water through the venturi tube structure.

8 Claims, 6 Drawing Sheets

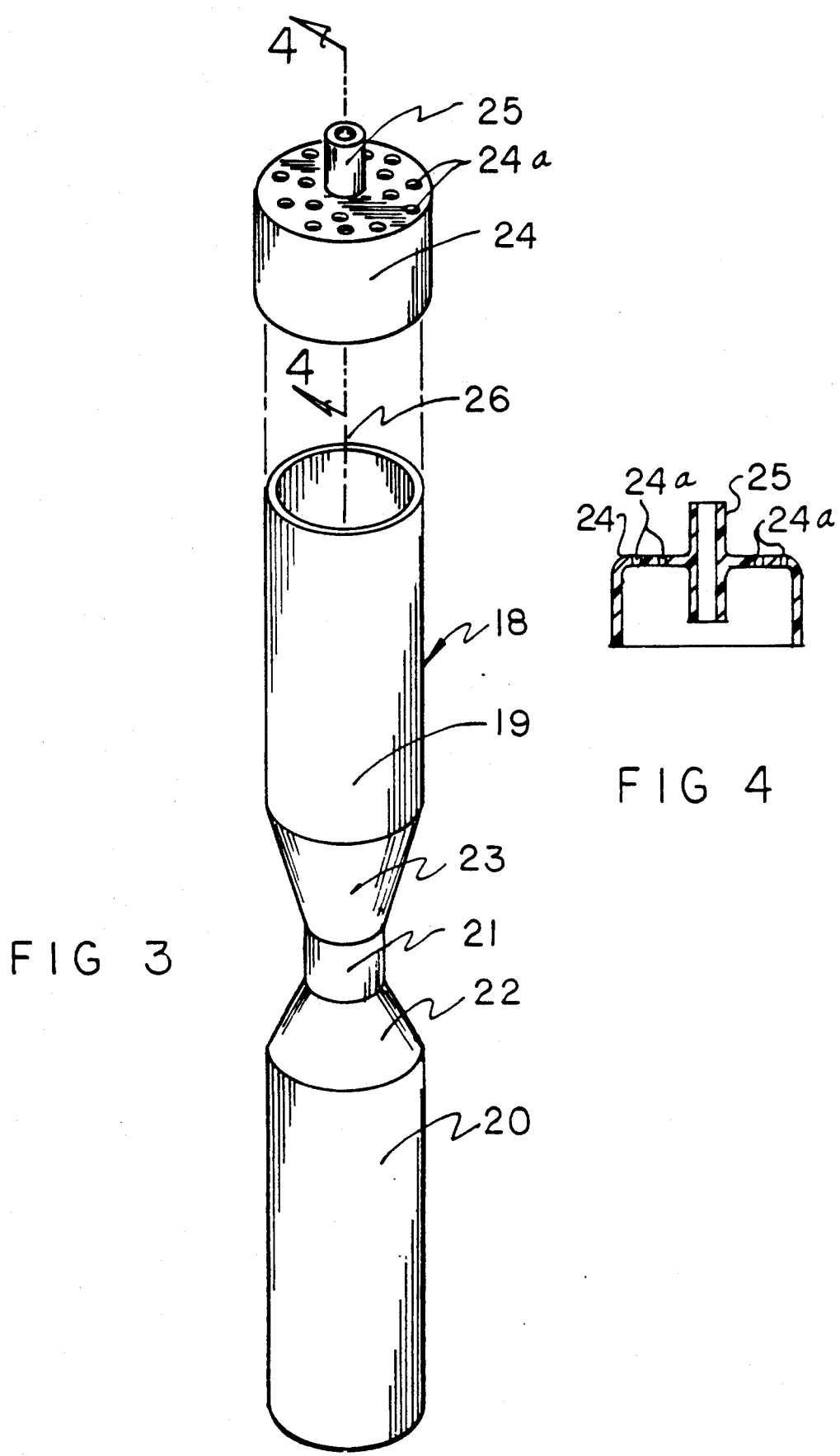

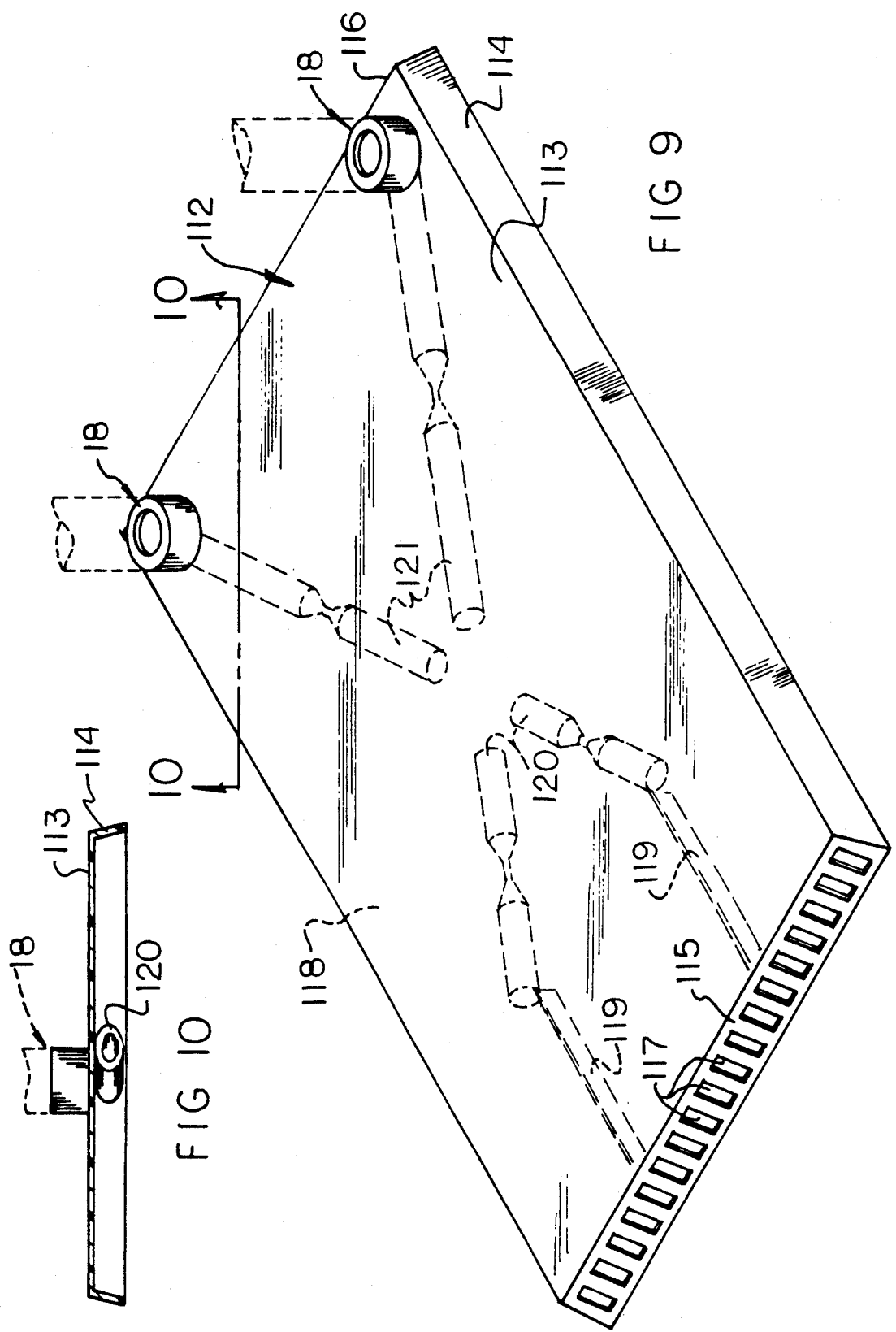

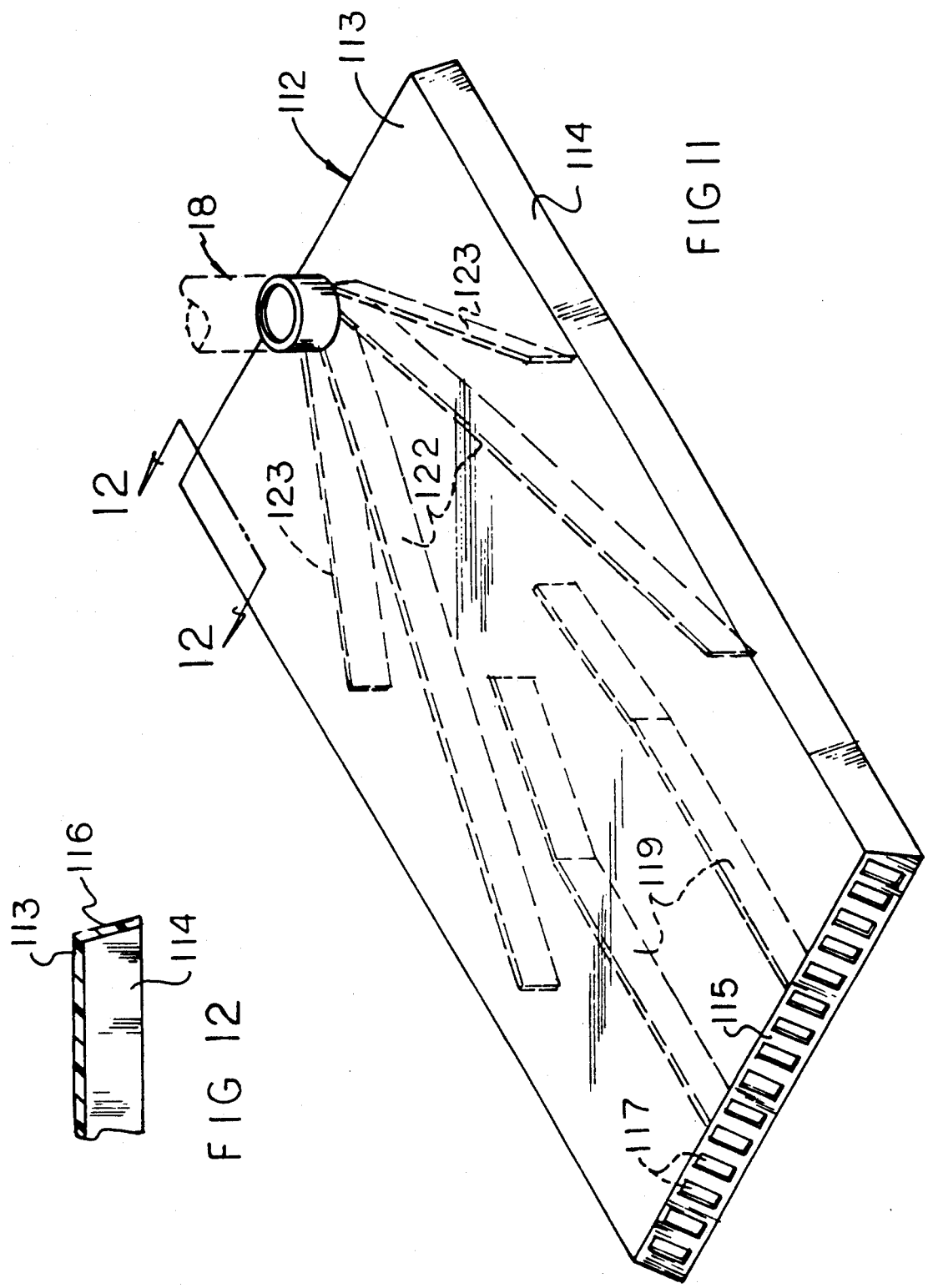

AQUARIUM VENTURI TUBE

BACKGROUND OF THE INVENTION

1. Field of the Invention

The field of invention relates to aquarium apparatus, and more particularly pertains to a new and improved aquarium venturi tube arranged for the aeration and filtration of aquarium water directed therethrough.

2. Description of the Prior Art

The venturi tube structure is arranged in prior art to effect lifting of fluid therethrough in a manner as set forth in U.S Pat. No. 4,934, 187 incorporated herein by reference.

U.S. Pat. No. 4,957,623 to Henzlick sets forth an aquarium containing system utilizing a filtration plate having a fluid lift tube in cooperation with a fluid directional tube to direct aerated water into the associated aquarium, also incorporated herein by reference as to its teaching relative to lift tubes.

As such, it may be appreciated that there continues to be a need for a new and improved aquarium venturi tube as set forth by the instant invention which addresses both the problems of ease of use as well as effectiveness in construction effecting increased efficiency of fluid flow due to the venturi configuration of the lift tube in a manner to minimize the requisite number of lift tubes or aeration tubes required within an aquarium organization and in this respect, the present invention substantially fulfills this need.

SUMMARY OF THE INVENTION

In view of the foregoing disadvantages inherent in the known types of aquarium apparatus now present in the prior art, the present invention provides an aquarium venturi tube wherein the same utilizes a fluid flow tube for aeration of an aquarium having a venturi central portion to enhance fluid flow therethrough. As such, the general purpose of the present invention, which will be described subsequently in greater detail, is to provide a new and improved aquarium venturi tube which has all the advantages of the prior art aquarium apparatus and none of the disadvantages.

To attain this, the present invention provides an organization to direct increased fluid flow through the tube to effect filtration and aeration thereof formed with an upper tube coaxially aligned within and spaced from a lower tube having a venturi central tube portion. An aeration tube is coaxially directed through the venturi tube structure, with constriction of the central tube effecting increased lifting of water through the venturi tube structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aquarium venturi tube which has all the advantages of the prior art aquarium apparatus and none of the disadvantages.

It is another object of the present invention to provide a new and improved aquarium venturi tube which may be easily and efficiently manufactured and marketed.

It is a further object of the present invention to provide a new and improved aquarium venturi tube which is of a durable and reliable construction.

An even further object of the present invention is to provide a new and improved aquarium venturi tube which is susceptible of a low cost of manufacture with regard to both materials and labor, and which accordingly is then susceptible of low prices of sale to the consuming public, thereby making such aquarium venturi tubes economically available to the buying public.

Still yet another object of the present invention is to provide a new and improved aquarium venturi tube which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the flow tube of the invention.

FIG. 4 is an orthographic view, taken along the lines 4—4 of FIG. 3 in the direction indicated by the arrows.

FIG. 9 is an isometric illustration of a preferred embodiment of the filter place structure of the invention.

FIG. 10 is an orthographic view, taken along the lines 10—10 of FIG. 9 in the direction indicated by the arrows.

FIG. 11 is an isometric illustration of the preferred embodiment of the filter plate structure utilizing a single flow tube.

FIG. 12 is an orthographic view, taken along the lines 12—12 of FIG. 11 in the direction indicated by the arrows.

DESCRIPTION OF THE PREFERRED EMBODIMENT

Figure 1:
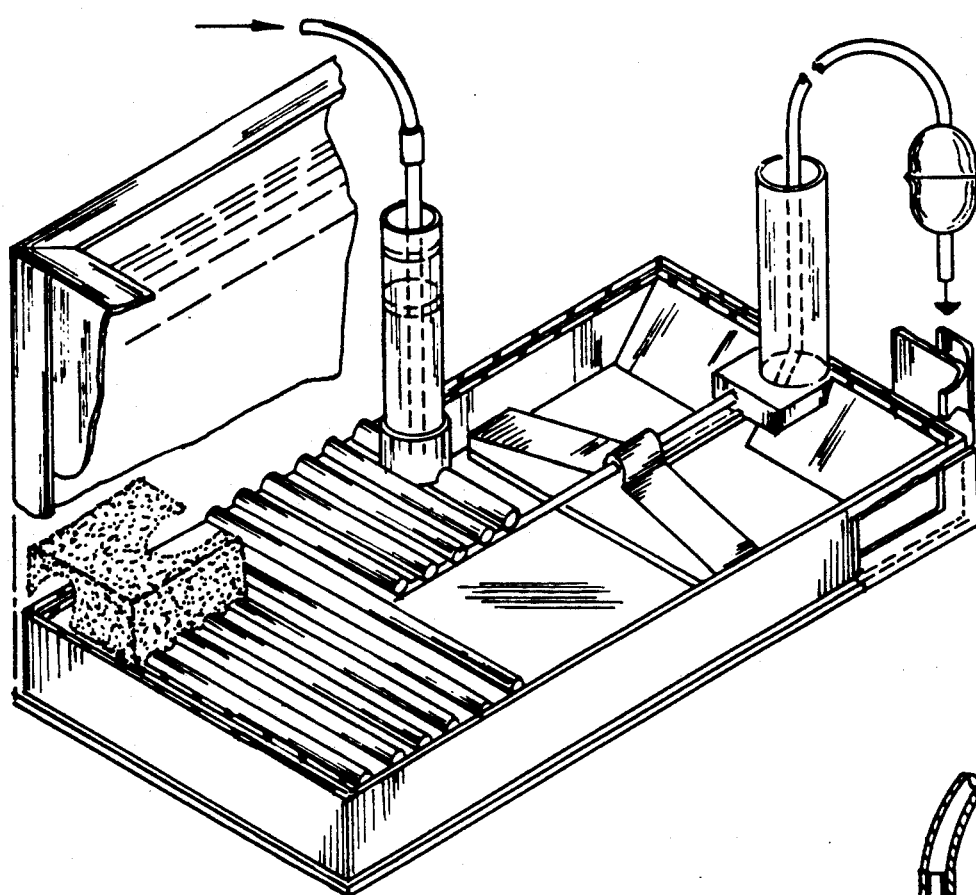
FIG. 1 is an isometric illustration of a prior art aquarium organization.

With reference now to the drawings, and in particular to FIGS. 1 to 12 thereof, a new and improved aquarium venturi tube embodying the principles and concepts of the present invention and generally designated by the reference numeral 10 will be described.

FIG. 1 illustrates the prior art organization as set forth in U.S. Pat. No. 4,957,623 incorporated herein by reference, to include an aeration tube in cooperation with an underlying filter plate within an aquarium organization.

Figure 2:
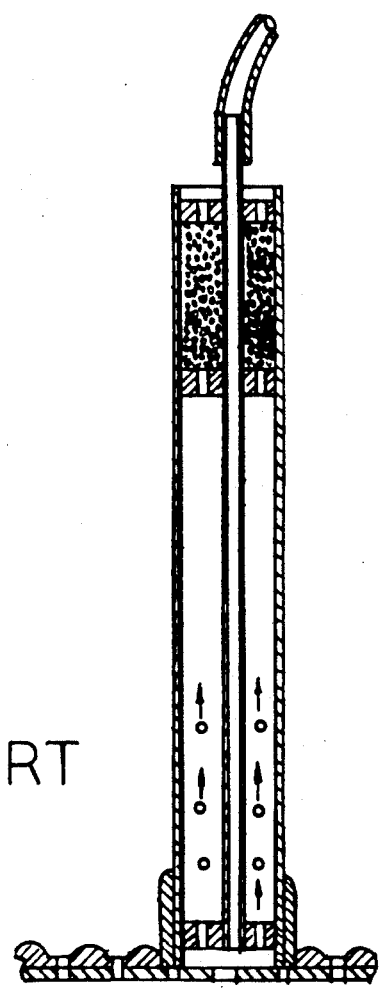
FIG. 2 is an orthographic cross-sectional illustration of an aeration tube as utilized in the prior art, as indicated in FIG. 1.

The FIG. 2 illustrates an orthographic cross-sectional illustration of the aeration tube utilized by the prior art as set forth in FIG. 1.

More specifically, the aquarium venturi tube 10 of the instant invention essentially comprises the organization mounted within an aquarium enclosure 11, indicated in phantom in figure of a type as illustrated in the FIG. 1 of prior art. A filter floor plate 12 is mounted upon the floor of the aquarium 11, including a matrix of apertures 13 directed therethrough. The apertures are directed through the filtration slots 14 of the filter plate 12, with the filtration slots 14 typically arranged to define parallel troughs 15 coextensively along the filter plate 12 to position and secure gravel mounted thereon, as typically utilized in an aquarium environment as illustrated in FIG. 1. The filter plate 12 includes a tubular mounting boss 16 arranged to include a central bore 17 directed therethrough. A flow tube 18 (see FIGS. 3 and 8) includes a lower tube 19 coaxially aligned with an upper tube 20, wherein a lower distal end of the lower tube 19 is mounted upon the mounting boss 16. A central venturi tube 21 coaxially aligned between the lower and upper tubes 19 and 20 is of a second diameter substantially less than the first diameter to create a venturi effect with fluid flow therethrough. The lower tube includes a lower tube upper conical tube 22, with the upper tube including an upper tube lower conical tube 23 that merge into the central venturi tube 21 to provide for laminae flow through the central venturi tube portion 21 in use.

A cap 24 is mounted to an upper distal end of the upper tube 20 having cap apertures 24a directed about the cap to direct fluid flow therethrough, with a cap tube 25 coaxially directed through the cap coaxially aligned relative to the flow tube 18 along the central axis 26 of the flow tube and cap when in an assembled configuration.

Figure 5:
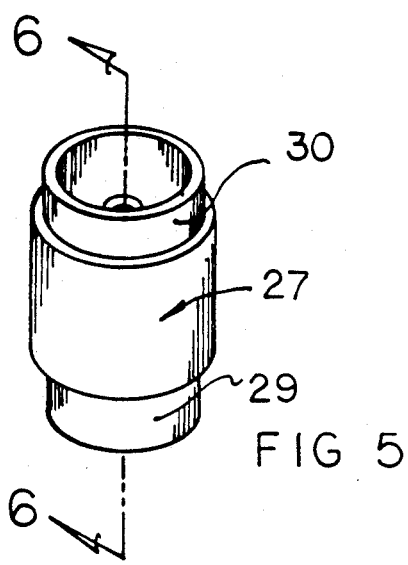
FIG. 5 is an isometric illustration of a filtration tube utilized by the invention.
Figure 6:
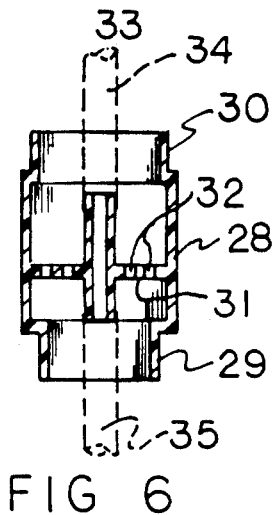
FIG. 6 is an orthographic view, taken along the lines 6—6 of FIG. 5 in the direction indicated by the arrows.
Figure 7:
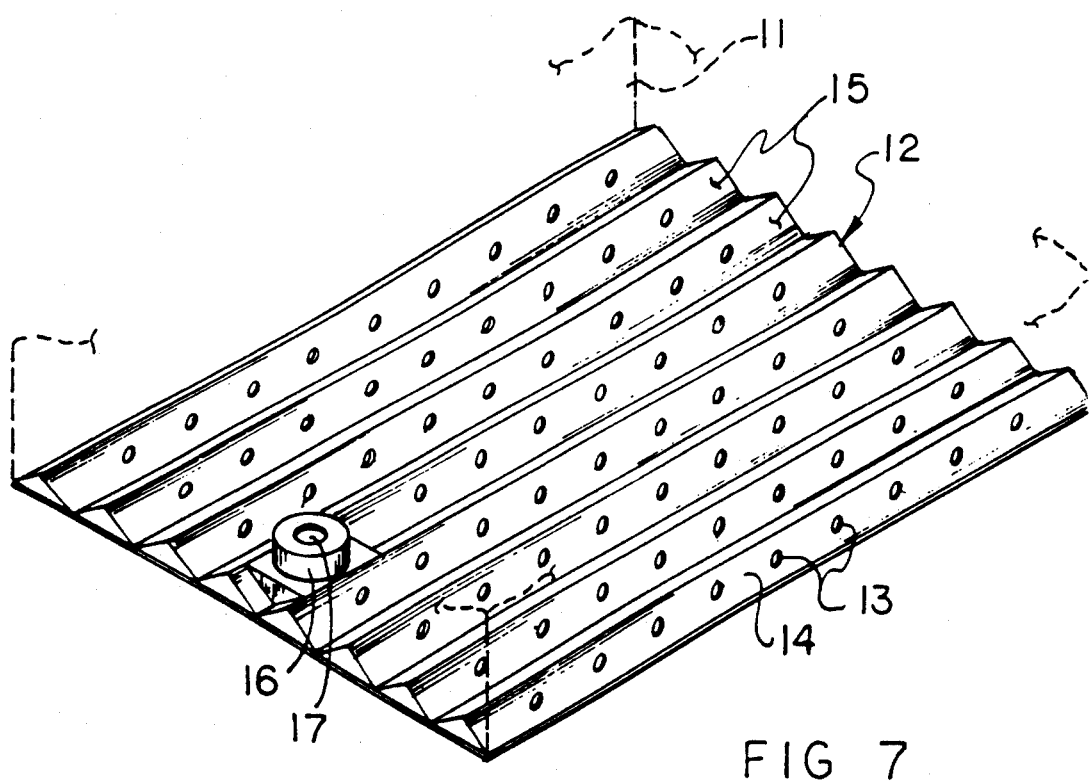
FIG. 7 is an isometric illustration of the filtration floor plate utilized by the invention.
Figure 8:
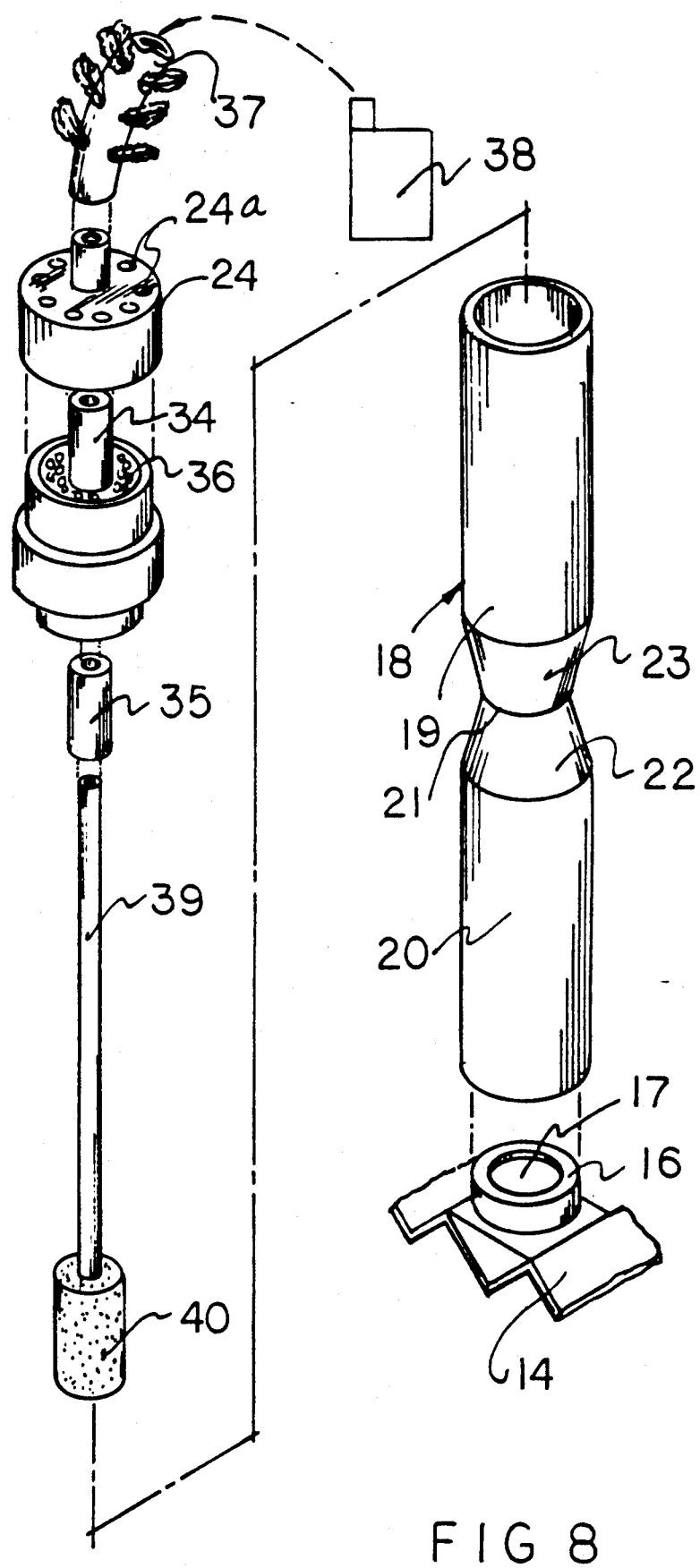
FIG. 8 is an isometric exploded illustration of the invention.

The FIGS. 5, 6, and 8 illustrate the use of a filtration tube 27 having a tubular body 28 substantially equal to the first diameter, having a lower mounting tube 29 received within the upper distal end of the upper tube 20, and an upper mounting tube 30 received within the cap 24. In an assembled configuration, it should be noted that the cap central bore 17 of the mounting boss 16, the flow tube 18, the filtration tube 27, and the cap 24 are coaxially aligned relative to one another.

The filtration tube is further formed with a central web 31 orthogonally oriented relative to the central axis 26 having web apertures 32 directed therethrough, with a web tube 33 directed coaxially and orthogonally through the central web 31. An upper aeration tube 34 is mounted to the web tube 34 above the central web 31 for mounting to an aeration delivery tube 37 from an air pump 38. A lower aeration tube 35 secured to the web tube 33 below the central web 31 effects pneumatic communication between a rigid lower delivery tube 39 and the aeration delivery tube 37. A ceramic aeration member 40 mounted to a lower distal end of the lower delivery tube 39 effects the projection of bubbles into the lower tube 19, whereupon the constriction of the aeration bubbles as it is directed through the central venturi tube portion 21 effects enhanced lifting of fluid flow through the flow tube 18 for enhance aeration of fluid within the aquarium, as well as the filtration of such fluid in use of the filtration tube structure 27. It should be noted that water flow is directed coextensively from the filter plate 112 in directing of fluid flow therethrough.

The FIGS. 9-12 illustrate a preferred filter plate structure 112 having continuous planar top wall 113, with a continuous side wall 114. The side wall 114 includes a first end wall 115 spaced from a second end wall 116, with the first end wall 115 including a row of first end wall fluid entry slots 117 directing fluid from the associated aquarium into the filter plate, or more specifically, the filter plate cavity 118. Parallel first directional plates 119 orthogonally and integrally mounted to the first end wall 115 direct fluid flow to a plurality of flow tubes 118 mounted to the top wall 113 adjacent the second end wall 116. Reference to FIG. 9 includes the use of directional guide tubes defined by first and second guide tubes 120 and 121 interconnected by a central venturi 120a and are utilized directing fluid to the flow tubes, wherein alternatively with the use of a single flow tube as indicated in FIG. 11, second direction plates 122 merge together defining an acute angle therebetween towards the flow tube 118 oriented adjacent the second end wall 116 directed through the top wall 113. Third directional plates 123 are positioned exteriorly of the second directional plates to further enhance guidance of fluid flow towards the flow tube 118 as described above.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aquarium venturi tube, comprising,
   a filter plate, the filter plate arranged for positioning in an aquarium, wherein the filter plate includes a matrix of apertures directed therethrough, and
   the filter plate further including a cylindrical and tubular boss mounted to the filter plate extending upwardly thereof, the boss including a central bore directed therethrough, and
   a flow tube having a lower tube coaxially aligned and positioned below an upper tube, wherein the lower tube includes a lower tube lower distal end receiving the boss therewithin, and the lower tube includes a lower tube upper distal end having a lower tube upper conical tubular portion formed thereon, and
   the upper tube including an upper tube lower distal end, wherein the upper tube lower distal end includes an upper tube lower conical tube portion formed thereon, and
   a central venturi tube positioned between the lower tube upper conical tube portion and the upper tube lower conical tube portion, and
   aeration means coaxially directed through the flow tube positioned within the lower tube below the central venturi tube.

2. A tube as set forth in claim 1 wherein the lower tube and the upper tube are of a first diameter, and wherein the central venturi tube is of a second diameter substantially less than the first diameter.

3. A tube as set forth in claim 2 including a cap, the cap arranged for mounting upon the upper tube at an upper distal end of the upper tube, the cap including a matrix of apertures directed therethrough, and the cap including a cap tube coaxially directed through the cap, and the flow tube and the cap are defined about a central axis, with the aeration means mounted to the cap tube above the cap.

4. A tube as set forth in claim 3 including a filtration tube, the filtration tube arranged for reception between the cap and the upper tube, and the filtration tube including a tubular body having a lower mounting tube arranged for reception within the upper distal end of the upper tube, and the tube body including an upper mounting tube arranged for projection within the cap, and the tube body including a central web, the central web including a matrix of apertures directed therethrough, with a web tube coaxially directed through the central web coaxially aligned about the central axis, and an upper aeration tube mounted to the web tube pneumatically communicating the web tube with the cap tube, and a lower aeration tube mounted to the central web tube below the central web, and a lower delivery tube mounted to the lower aeration tube, wherein the lower delivery tube includes a ceramic aeration member mounted to the lower distal end of the lower delivery tube, wherein the ceramic aeration member is oriented coaxially within the lower tube below the central venturi tube.

5. A tube as set forth in claim 4 wherein the aeration means includes an air pump, including an air delivery tube in pneumatic communication with the air pump and the cap tube above the cap.

6. An aquarium venturi tube apparatus, comprising,
   a filter plate, the filter plate arranged for positioning in an aquarium, and
   the filter plate further including a flow tube mounted to the filter plate extending upwardly thereof, the flow tube having a lower tube coaxially aligned and positioned below an upper tube, wherein the lower tube includes a lower tube lower distal end receiving the boss therewithin, and the lower tube includes a lower tube upper distal end having a lower tube upper conical tubular portion formed thereon, and
   the upper tube including an upper tube lower distal end, wherein the upper tube lower distal end includes an upper tube lower conical tube portion formed thereon, and
   a central venturi tube positioned between the lower tube upper conical tube portion and the upper tube lower conical tube portion, and
   aeration means coaxially directed through the flow tube positioned within the lower tube below the central venturi tube.

7. An apparatus as set forth in claim 6 wherein the filter plate includes a planar top wall having a continuous side wall, wherein the continuous side wall includes a first end wall spaced from a second end wall, the first end wall including a plurality of fluid entry slots, the filter plate defining a cavity between the top wall and the side wall, and the slots directing fluid flow into the cavity into communication with the flow tube.

8. An apparatus as set forth in claim 6 including a plurality of first parallel directional plates orthogonally mounted to the first end wall extending into the cavity, and second guide plates mounted within the cavity extending in a spaced relationship relative to the first directional plates merging towards one another to defined an acute angle therebetween towards the flow tube, and third directional plates positioned exteriorly of the second directional plates directing fluid flow to the flow tube.

* * * * *